(12) United States Patent
Katsuta et al.

(10) Patent No.: US 11,821,383 B2
(45) Date of Patent: Nov. 21, 2023

(54) CONTROL APPARATUS FOR ENGINE

(71) Applicant: SUBARU CORPORATION, Tokyo (JP)

(72) Inventors: Keisuke Katsuta, Tokyo (JP); Tatsuya Ichikawa, Tokyo (JP); Yohsuke Shimoji, Tokyo (JP); Takuya Shidooka, Tokyo (JP); Shinsuke Onodera, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/150,370

(22) Filed: Jan. 5, 2023

(65) Prior Publication Data

US 2023/0235713 A1    Jul. 27, 2023

(30) Foreign Application Priority Data

Jan. 25, 2022   (JP) ................ 2022-009242

(51) Int. Cl.
*F02D 41/38* (2006.01)
*F02D 41/14* (2006.01)
*F02D 41/00* (2006.01)

(52) U.S. Cl.
CPC .......... *F02D 41/38* (2013.01); *F02D 41/009* (2013.01); *F02D 41/1454* (2013.01)

(58) Field of Classification Search
CPC ........ F02D 41/00; F02D 41/009; F02D 41/14; F02D 41/1454; F02D 41/38
See application file for complete search history.

(56) References Cited

U.S. PATENT DOCUMENTS

| | | | |
|---|---|---|---|
| 8,261,603 B2* | 9/2012 | Kondo | F02D 41/1498 73/114.03 |
| 2010/0152991 A1* | 6/2010 | Suzuki | F02D 29/00 701/99 |

FOREIGN PATENT DOCUMENTS

JP    2004-308431 A    11/2004

* cited by examiner

*Primary Examiner* — John Kwon
*Assistant Examiner* — Johnny H Hoang
(74) *Attorney, Agent, or Firm* — McDermott Will & Emery LLP

(57) ABSTRACT

A control apparatus for an engine includes a crank angle sensor and a processor. The processor acquires a first crank angular velocity difference which is a change in a crank angular velocity in a first region. The first region includes a rotational change correlated with an engine torque output. The processor acquires a second crank angular velocity difference which is a change in the crank angular velocity in a second region. The second region includes a rotational change correlated with a combustion rate attributable to an air-fuel ratio. In a case where the first crank angular velocity difference is less than or equal to a first threshold and the second crank angular velocity difference is less than or equal to a second threshold, the processor performs an increase correction on a fuel amount to be supplied to the engine.

8 Claims, 7 Drawing Sheets

CONTROL APPARATUS FOR ENGINE

CROSS-REFERENCE TO RELATED APPLICATIONS

The present application claims priority from Japanese Patent Application No. 2022-009242 filed on Jan. 25, 2022, the entire contents of which are hereby incorporated by reference.

BACKGROUND

The disclosure relates to a control apparatus for an engine.

Upon starting an engine, startability has been ensured by performing an increase correction on an amount of fuel and injecting the corrected amount of fuel. After activating an air-fuel ratio sensor provided in an exhaust system, feedback control has been performed in such a manner that an air-fuel ratio of an air-fuel mixture matches a target air-fuel ratio, on the basis of a result of detection performed by the air-fuel ratio sensor.

However, in a case where a heavy fuel having low volatility is used, for example, an air-fuel ratio becomes lean during cold start and a combustion state deteriorates or becomes unstable. This can lead to a decrease in the number of revolutions due to a decrease in engine torque, and a deterioration in emission due to an increase in unburned substances contained in emission gas. For example, during a period from immediately after the starting until the activation of the air-fuel ratio sensor, the air-fuel ratio sensor is not able to detect the air-fuel ratio, and is thus not able to detect that the air-fuel ratio is lean and to feed it back (e.g., to perform the increase correction on the fuel amount).

Japanese Unexamined Patent Application Publication (JP-A) No. 2004-308431 discloses a technique that monitors, when the engine is started, transition in engine speed until the number of revolutions reaches idle speed, and, if the number of revolutions drops, determines that a fuel property is heavy fuel which is prevented from being vaporized easily.

SUMMARY

An aspect of the disclosure provides a control apparatus for an engine. The control apparatus includes a crank angle sensor and a processor. The crank angle sensor is configured to detect a rotational position of a crankshaft of the engine. The processor is configured to acquire a crank angular velocity for each interval of a fixed crank angle on the basis of a temporal change in the rotational position of the crankshaft detected by the crank angle sensor, and control a fuel amount to be supplied to the engine on the basis of the crank angular velocity. The processor is configured to acquire a first crank angular velocity difference which is a change in the crank angular velocity in a first region. The first region includes a rotational change correlated with an engine torque output (a combustion intensity) in one or both of a compression stroke and an expansion stroke. The processor is configured to acquire a second crank angular velocity difference which is a change in the crank angular velocity in a second region. The second region includes a rotational change correlated with a combustion rate attributable to an air-fuel ratio in one or both of the compression stroke and the expansion stroke. In a case where the first crank angular velocity difference is less than or equal to a first threshold and the second crank angular velocity difference is less than or equal to a second threshold, the processor is configured to perform an increase correction on the fuel amount to be supplied to the engine.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
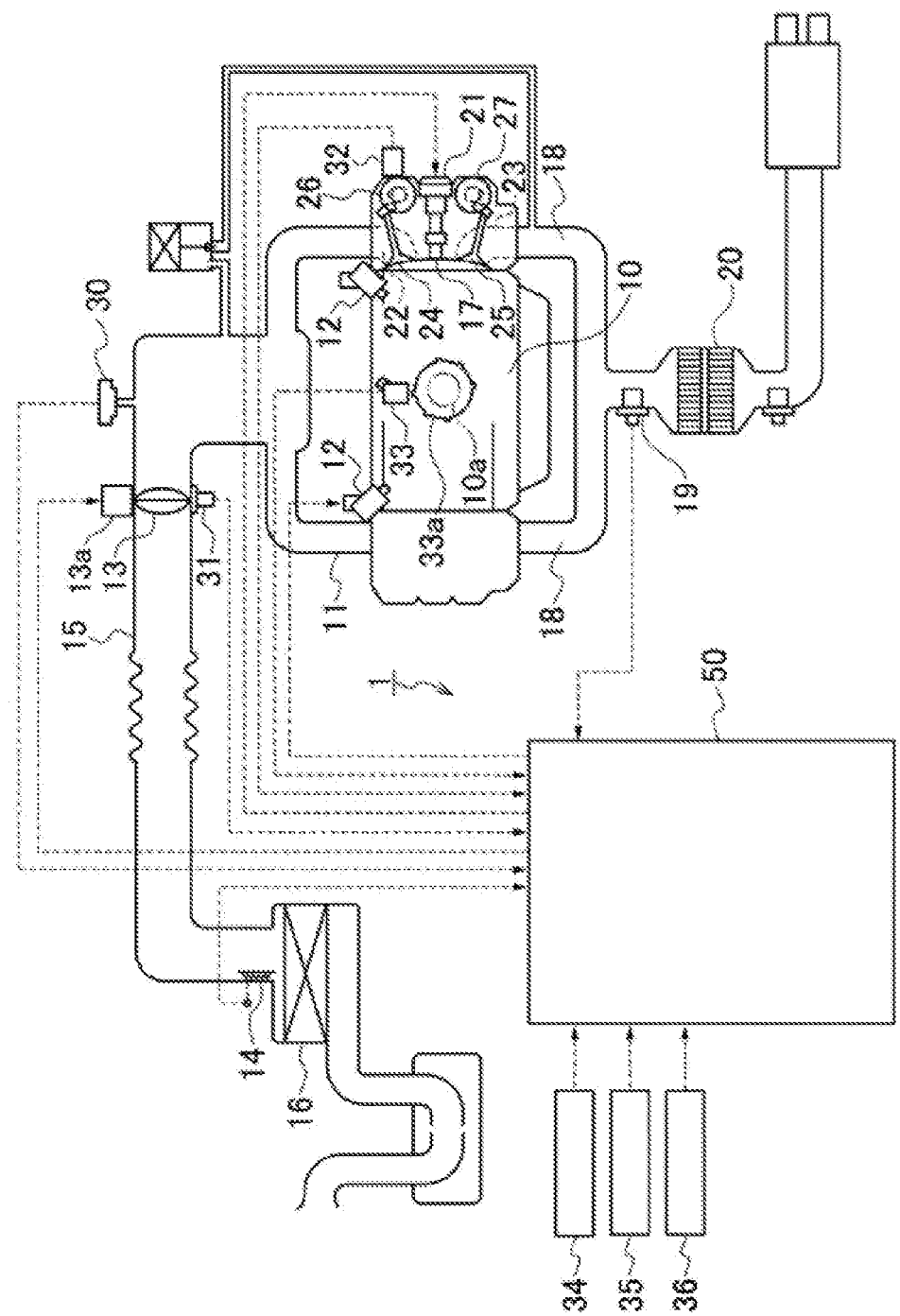
FIG. 1 is a diagram illustrating a configuration of a control apparatus for an engine according to one example embodiment and an engine to which the control apparatus is applied.

A drop in engine speed can occur in a case where, for example, an air-fuel ratio is enriched or becomes excessively rich due to malfunction in an inlet system such as a throttle valve or in a fuel system such as an injector. In such a case where the air-fuel ratio becomes rich, a technique disclosed in JP-A No. 2004-308431 can erroneously determine that a heavy fuel is used. If a fuel property is erroneously determined, a fuel amount may be increased, which can further deteriorate a combustion state.

It is desirable to provide a control apparatus for an engine which makes it possible to prevent combustion deterioration (i.e., to improve combustion stability) at time of engine start. In one example, in a period until an air-fuel ratio sensor is activated during cold start, the combustion stability is improved by preventing the combustion deterioration caused by a lean air-fuel ratio attributable to a fuel property of a heavy fuel.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

First, with reference to FIG. 1, a configuration of a control apparatus 1 for an engine according to one example embodiment will be described. FIG. 1 is a diagram illustrating a configuration of the control apparatus 1 for an engine and an engine 10 to which the control apparatus 1 is applied.

The engine 10 may be, for example, a horizontally opposed four-cylinder gasoline engine. Further, the engine 10 may be a direct injection engine that directly injects fuel into cylinders. In the engine 10, intake air from an air cleaner 16 may be throttled by an electronic controlled throttle valve 13 provided in an intake pipe 15, may pass through an intake manifold 11, and may be taken into cylinders each included in the engine 10. Hereinafter, the electronic controlled throttle valve 13 may be simply referred to as a "throttle valve 13". An amount of intake air from the air cleaner 16 may be detected by an air flow meter 14. The air flow meter 14 may be disposed between the air cleaner 16 and the throttle valve 13. A vacuum sensor 30 may be disposed inside a collector, i.e., a surge tank, included in the intake manifold 11. The vacuum sensor 30 may detect a pressure (an intake manifold pressure) inside the intake manifold 11. Further, a throttle angle sensor 31 may be disposed in the throttle valve 13. The throttle angle sensor 31 may detect an opening degree of the throttle valve 13.

A cylinder head may include an intake port 22 and an exhaust port 23 for each cylinder (only one bank is illustrated in FIG. 1). The intake port 22 and the exhaust port 23 may be provided with an intake valve 24 and an exhaust valve 25 for opening and closing the intake port 22 and the exhaust port 23, respectively. A variable valve timing mechanism 26 may be disposed between an intake camshaft and an intake cam pulley for driving the intake valve 24. The variable valve timing mechanism 26 may advance and retard a valve timing, i.e., an opening and closing timing, of the intake valve 24 by rotating the intake cam pulley and the intake camshaft relative to each other to continuously change a rotational phase (a displacement angle) of the intake camshaft with respect to a crankshaft 10a. The variable valve timing mechanism 26 may variably set the opening and closing timing of the intake valve 24 in accordance with an engine operation status.

Similarly, a variable valve timing mechanism 27 may be disposed between an exhaust camshaft and an exhaust cam pulley. The variable valve timing mechanism 27 may advance and retard a valve timing, i.e., an opening and closing timing, of the exhaust valve 25 by rotating the exhaust cam pulley and the exhaust camshaft relative to each other to continuously change a rotational phase (a displacement angle) of the exhaust camshaft with respect to the crankshaft 10a. The variable valve timing mechanism 27 may variably set the opening and closing timing of the exhaust valve 25 in accordance with an engine operation status.

An injector 12 may be attached to each cylinder of the engine 10. The injector 12 may inject fuel into the cylinder. The injector 12 may directly inject the fuel pressurized by an unillustrated high-pressure fuel pump into a combustion chamber of the cylinder.

Further, an ignition plug 17 and an igniter-built-in coil 21 may be attached to the cylinder head of each cylinder. The ignition plug 17 may ignite an air-fuel mixture. The igniter-built-in coil 21 may apply high voltage to the ignition plug 17. In each cylinder of the engine 10, the air-fuel mixture of the intake air and the fuel injected by the injector 12 may be ignited by the ignition plug 17 and combusted. The emission gas generated by the combustion may be discharged through an exhaust pipe 18.

In the example embodiment, employed as the exhaust pipe 18 may be a 4-2-1 layout, in order not to be interfered with the exhaust. The 4-2-1 layout may have the following structure. First, a group of a first cylinder (#1) and a second cylinder (#2) and a group of a third cylinder (#3) and a fourth cylinder (#4) may be each merged, i.e., assembled, and thereafter, the two groups may be assembled into one. Note that, for example, a 4-1 layout may be employed instead of the 4-2-1 layout.

A air-fuel ratio sensor 19 may be attached to a position downstream of the assembled portion of the exhaust pipe 18 and upstream of an exhaust purification catalyst 20 to be described later. As the air-fuel ratio sensor 19, a linear air-fuel ratio sensor (a LAF sensor) may be used. The LAF sensor may be able to output a signal corresponding to an oxygen concentration and an unburned gas concentration in the emission gas, that is, a signal corresponding to an air-fuel ratio of the air-fuel mixture, and to linearly detect the air-fuel ratio. In one embodiment, the air-fuel ratio sensor 19 may serve as an "air-fuel ratio sensor".

The exhaust purification catalyst 20 may be disposed downstream of the air-fuel ratio sensor 19. The exhaust purification catalyst 20 may be a three-way catalyst. The exhaust purification catalyst 20 may simultaneously oxidize hydrocarbons (HC) and carbon monoxide (CO) included in the emission gas and reduce nitrogen oxides (NOx) included in the emission gas to thereby purify harmful gas components included in the emission gas into carbon dioxide ($CO_2$), water vapor ($H_2O$), and nitrogen ($N_2$) which are harmless.

In addition to the air flow meter 14, the air-fuel ratio sensor 19, the vacuum sensor 30, and the throttle angle sensor 31 described above, a cam angle sensor 32 may be attached near the camshaft of the engine 10. The cam angle sensor 32 may perform cylinder discrimination of the engine 10. Further, a crank angle sensor 33 may be attached near the crankshaft 10a. The crank angle sensor 33 may detect a rotational position of the crankshaft 10a. A timing rotor 33a may be attached at an end of the crankshaft 10a. The timing rotor 33a may have, for example, protrusions of 34 teeth with two teeth missing that are formed at intervals of 10°. The crank angle sensor 33 may detect the rotational position of the crankshaft 10a by detecting the presence or absence of the protrusions of the timing rotor 33a. For example, an electromagnetic pickup sensor may be used as each of the cam angle sensor 32 and the crank angle sensor 33. In one embodiment, the crank angle sensor 33 may serve as a "crank angle sensor".

The sensors may be coupled to an electronic control unit 50. Hereinafter, the electronic control unit 50 may be referred to as an "ECU 50". Various other sensors may also be coupled to the ECU 50. Examples of the other sensors may include: a coolant temperature sensor 34 that detects a temperature of cooling water of the engine 10; an oil temperature sensor 35 that detects a temperature of lubricating oil; and an accelerator pedal angle sensor 36 that detects a depression amount of an accelerator pedal, that is, an opening degree of the accelerator pedal.

The ECU 50 may include, for example, a microprocessor that performs calculation, an electrically erasable programmable read only memory (EEPROM) that stores a program, etc., for causing the microprocessor to execute processes, a random access memory (RAM) that stores various kinds of data such as calculation results, a back-up RAM that holds the stored data with use of a battery, and an input/output I/F. The ECU 50 may further include, for example, an injector driver that drives the injector 12, an output circuit that outputs an ignition signal, a motor driver that drives an electric motor 13a which opens and closes the electronic controlled throttle valve 13.

The ECU 50 may perform the cylinder discrimination on the basis of an output from the cam angle sensor 32, and may determine a crank angular velocity and an engine speed on the basis of an output from the crank angle sensor 33. Details thereof will be described later. Further, the ECU 50 may acquire, on the basis of detection signals supplied by the various sensors described above, various kinds of information including, for example, an amount of intake air, an intake pipe negative pressure, an accelerator pedal angle, an air-fuel ratio of the air-fuel mixture, and a cooling water temperature and an oil temperature of the engine 10. The ECU 50 may comprehensively control the engine 10 by controlling an injection quantity, an ignition timing, and various devices such as a throttle valve 13 on the basis of the acquired various kinds of information.

The ECU 50 may serve to prevent combustion deterioration (i.e., to improve combustion stability) at time of engine start. In one example, in a period until the air-fuel ratio sensor 19 is activated during cold start, the combustion stability is improved by preventing the combustion deterioration caused by a lean air-fuel ratio attributable to a fuel property of a heavy fuel. The ECU 50 may achieve the above operation by the microprocessor executing the program stored in the EEPROM. In one embodiment, the ECU 50 may serve as a "processor".

The ECU 50 may acquire a crank angular velocity, i.e., an engine speed, for each interval of a fixed crank angle (e.g., 30 degrees CA) on the basis of a temporal change in the rotational position of the crankshaft 10a detected by the crank angle sensor 33. Note that the crank angular velocity and the engine speed herein are handled as synonyms.

The ECU 50 may acquire a first crank angular velocity difference (a combustion effect variation). The first crank angular velocity difference (the combustion effect variation) is a change in the crank angular velocity in a first region (a combustion intensity determination region). The first region (the combustion intensity determination region) includes a rotational change correlated with an engine torque output (a combustion intensity (strong/weak)) in one or both of a compression stroke and an expansion stroke. Further, the ECU 50 may acquire a second crank angular velocity difference (a λ effect variation). The second crank angular velocity difference (the λ effect variation) is a change in the crank angular velocity in a second region (a λ effect determination region). The second region (the λ effect determination region) includes a rotational change correlated with a combustion rate attributable to the air-fuel ratio (the fuel property) in one or both of the compression stroke and the expansion stroke. In a case where the first crank angular velocity difference (the combustion effect variation) is less than or equal to a first threshold and the second crank angular velocity difference (the λ effect variation) is less than or equal to a second threshold, the ECU 50 may perform an increase correction on a fuel supply amount. Note that respective details of the first region, the second region, the first threshold, and the second threshold will be described later.

The air-fuel mixture may be ignited at the same timing as a timing when the excess air ratio λ is 1 which is a stoichiometric ratio. Even in such a case, as the air-fuel ratio of the air-fuel mixture becomes leaner, a timing at which the combustion ends may become late (i.e., the torque output may be suppressed), and an increase in engine revolution may be suppressed (i.e., rotational fluctuation may decrease). Accordingly, the ECU 50 may determine whether the combustion is weak (i.e., the torque output is low) and determine whether the weak combustion is attributed to the lean air-fuel ratio, by acquiring: a crank angular velocity difference in a section having enough sensitivity to engine torque for obtaining rotational fluctuation caused by occurrence of misfire or combustion rate reduction; and a crank angular velocity difference in a section in which the combustion rate attributable to the fuel (i.e., the lean air-fuel ratio) is to be detected.

Figure 4:
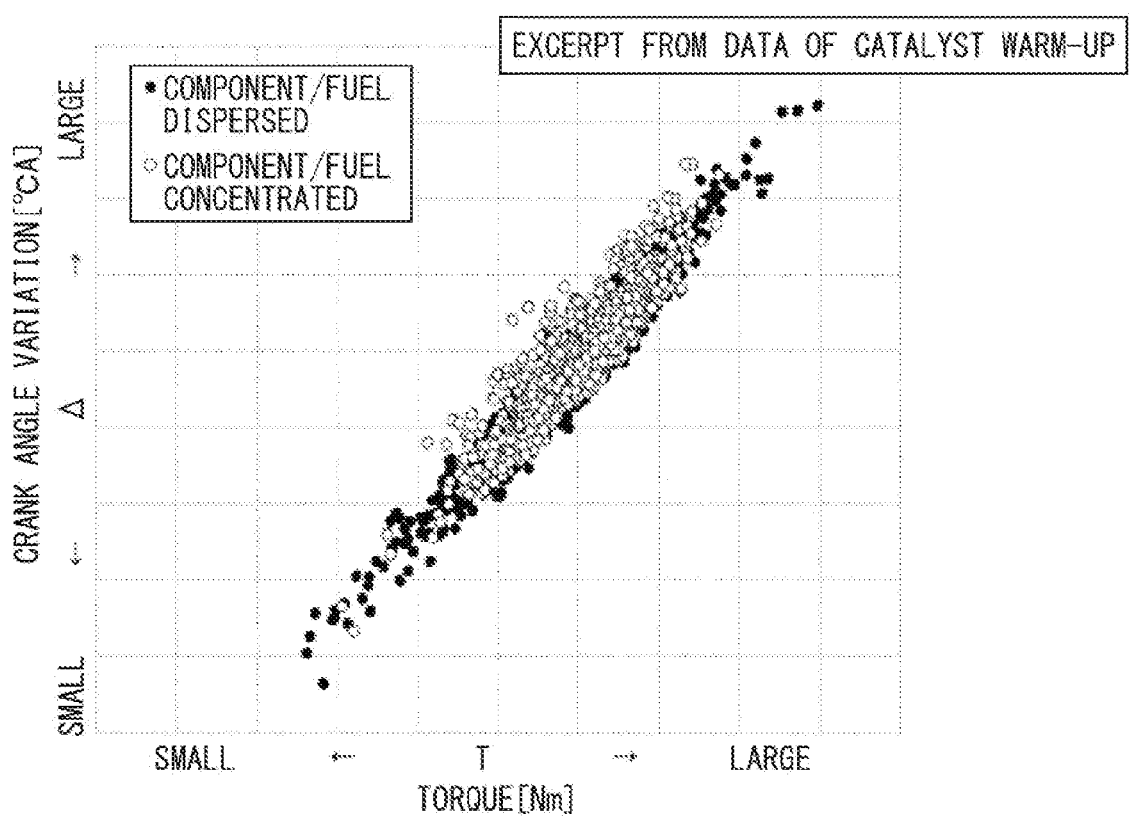
FIG. 4 is a diagram illustrating a relationship between rotational fluctuation of an engine and an engine torque.

FIG. 4 illustrates a relationship between the rotational fluctuation of the engine 10 and the engine torque. In FIG. 4, a horizontal axis represents a torque (Nm), and a vertical axis represents a crank angle variation (degrees CA). As illustrated in FIG. 4, crank angle fluctuation (the rotational fluctuation) is proportional to the torque. Accordingly, the first crank angular velocity difference (the combustion effect variation) may be acquired in a section having the sensitivity to the engine torque, for example, before the start of the combustion and at completion of the combustion.

Figure 5:
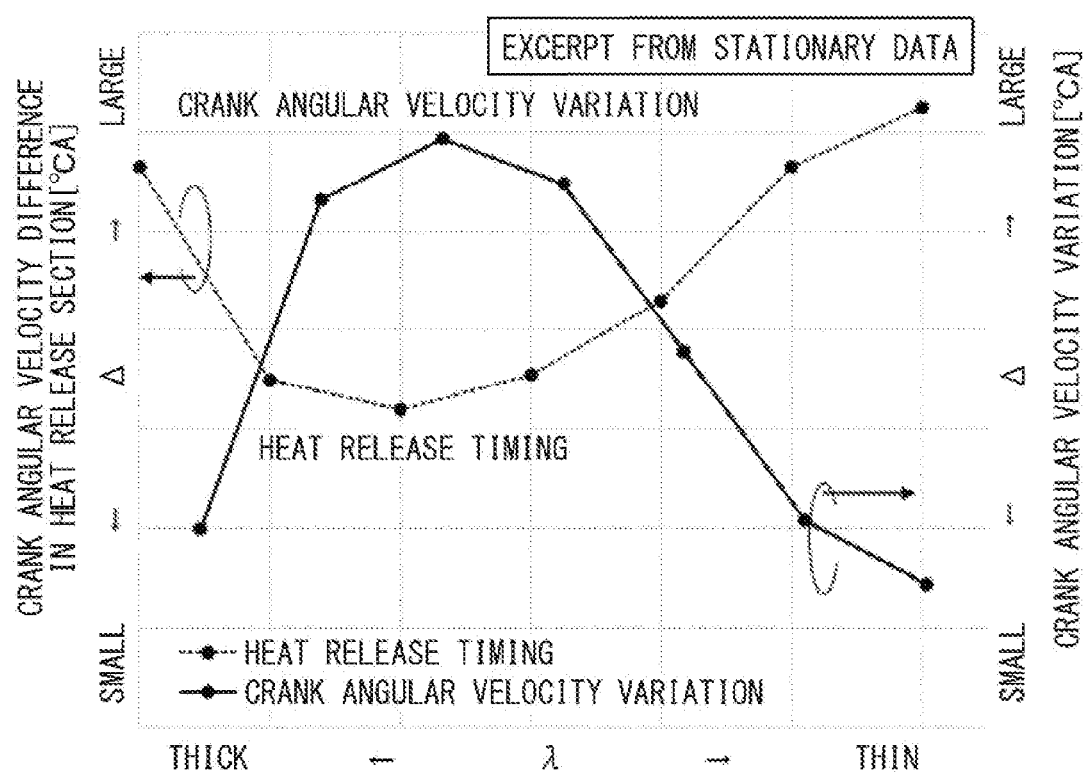
FIG. 5 is a diagram illustrating a relationship between an excess air ratio $\lambda$, a heat release timing, and a crank angular velocity variation.

FIG. 5 illustrates a relationship between the excess air ratio λ, a heat release timing, and a crank angular velocity variation. In FIG. 5, a horizontal axis represents the excess air ratio λ, and a vertical axis represents a crank angular velocity difference (degrees CA) and the crank angular velocity variation (degrees CA) in any heat release section. As illustrated in FIG. 5, a combustion rate and crank angular velocity fluctuation are correlated with each other. In other words, as the excess air ratio λ becomes leaner (λ>1), the heat release timing tends to become late (i.e., the combustion rate tends to become low), whereas the crank angular velocity variation is inversely proportional to the heat release timing. Accordingly, the second crank angular velocity difference (the λ effect variation) may be acquired in a section having a correlation with the air-fuel ratio, for example, at a timing at which the combustion starts and the torque starts to be outputted, and at a timing near the end of the combustion.

Figure 2:
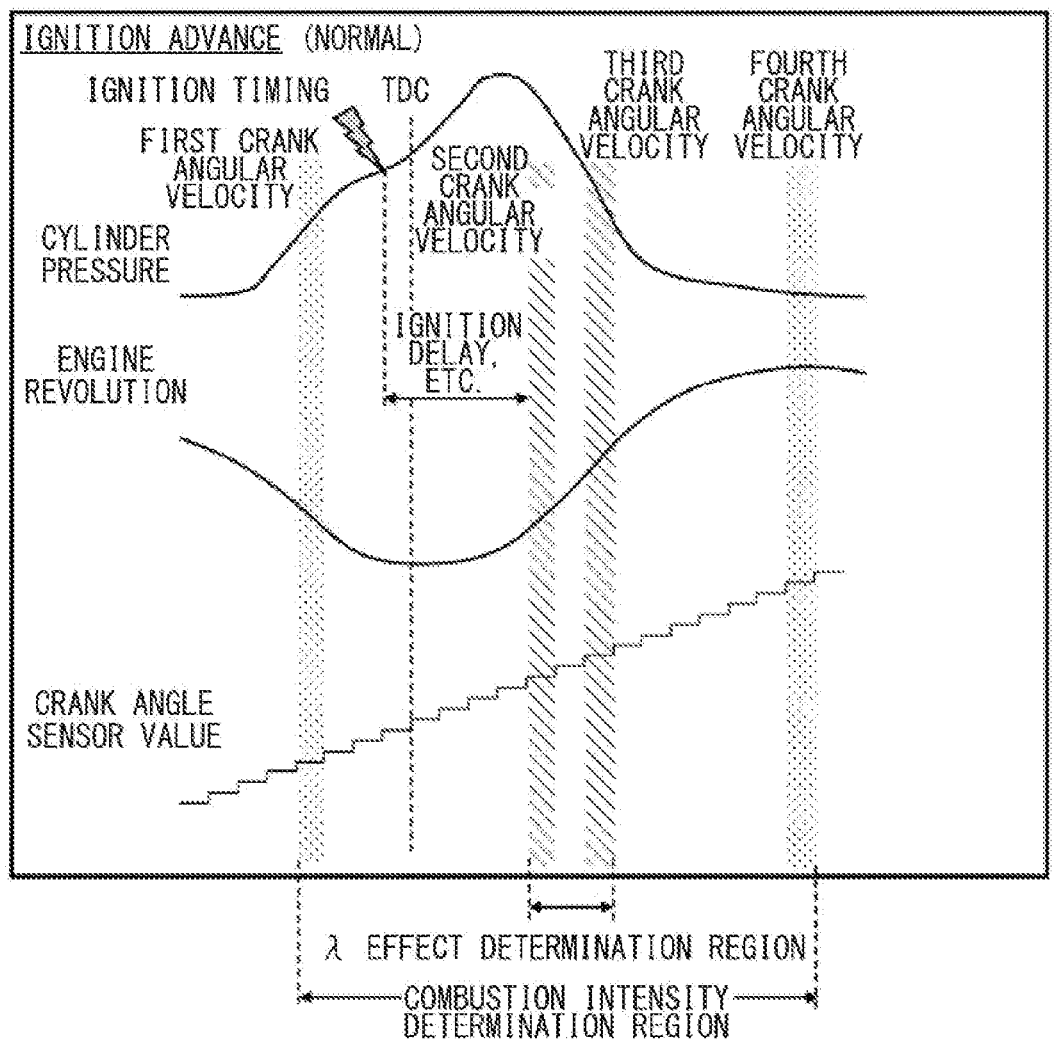
FIG. 2 is a diagram for explaining a region in which a first crank angular velocity difference and a second crank angular velocity difference are to be acquired in a case of advancing ignition.
Figure 3:
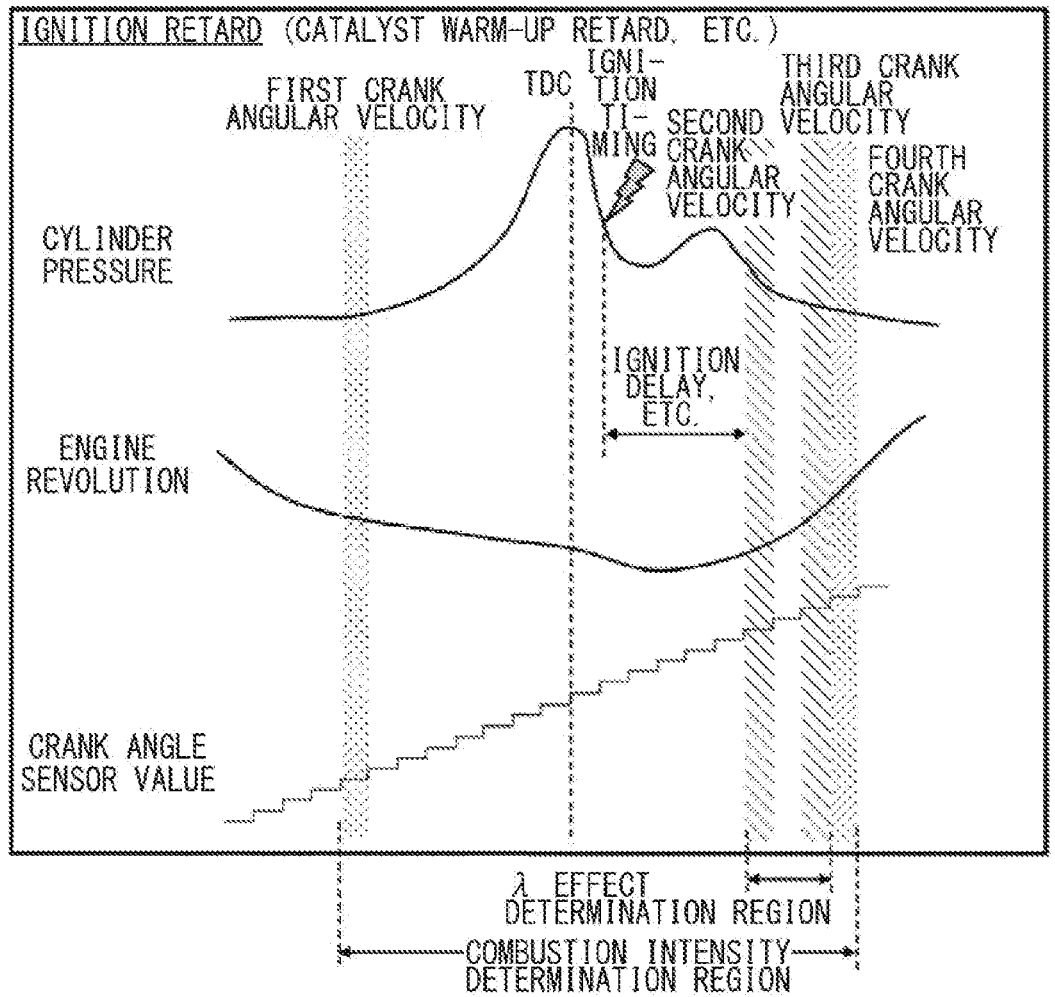
FIG. 3 is a diagram for explaining a region in which a first crank angular velocity difference and a second crank angular velocity difference are to be acquired in a case of retarding ignition.

In one example, as illustrated in FIGS. 2 and 3, the first region (the combustion intensity determination region) including the rotational change correlated with the engine torque output (the combustion intensity) may be set to include a region from before the combustion (before the ignition) of the air-fuel mixture to the end of the combustion of the air-fuel mixture. For example, the first region (the combustion intensity determination region) may have an interval of about 120 degrees CA to 150 degrees CA. The ECU 50 may acquire the first crank angular velocity difference (the combustion effect variation) on the basis of a difference between the crank angular velocity (the engine speed) at the end of the combustion and the crank angular velocity (the engine speed) before the combustion.

Further, as illustrated in FIGS. 2 and 3, the second region (the λ effect determination region) including the rotational change correlated with the combustion rate attributable to the air-fuel ratio (the fuel property) may be set to include a region from the timing at which the combustion of the air-fuel mixture starts and the torque starts to be outputted to the timing at which the combustion substantially ends, by making use of the fact that the heat release timing differs depending on the air-fuel ratio. For example, the second region (the λ effect determination region) may include a region from a 50% combustion point to a 90% combustion point, and may have an interval of about 30 degrees CA to 60 degrees CA. The ECU 50 may acquire the second crank angular velocity difference (the λ effect variation) on the basis of a difference between: the crank angular velocity (the engine speed) at the timing at which the combustion substantially ends (for example, the 90% combustion point); and the crank angular velocity (the engine speed) at the timing at which the combustion is started and the torque starts to be outputted (for example, the 50% combustion point).

FIG. 2 is a diagram for explaining a region in which the first crank angular velocity difference (the combustion effect variation) and the second crank angular velocity difference (the λ effect variation) are to be acquired in a case of advancing ignition. FIG. 3 is a diagram for explaining a region in which the first crank angular velocity difference (the combustion effect variation) and the second crank angular velocity difference (the λ effect variation) in a case of retarding ignition. In each of FIGS. 2 and 3, a horizontal axis represents a crank angle (degrees CA), and a vertical axis represents, from the top to the bottom, a cylinder pressure, the engine speed (the crank angular velocity), and a value outputted by the crank angle sensor.

The first crank angular velocity difference (the combustion effect variation) may not be influenced significantly by the ignition timing. In contrast, the second crank angular velocity difference (the λ effect variation) may focus on the combustion itself, in other words, the second crank angular velocity difference (the λ effect variation) may vary in accordance with the ignition timing, it may thus be desirable to take into consideration influences including, for example, ignition delay caused by the ignition timing, and a combustion start timing.

Accordingly, the ECU 50 may vary, in accordance with an ignition timing, the second region (the λ effect determination region) in which the second crank angular velocity difference (the λ effect variation) is to be acquired and which includes the rotational change correlated with the combustion rate attributable to the air-fuel ratio (the fuel property). Reference is made to the λ effect determination region in the case of advancing ignition illustrated in FIG. 2 and the λ effect determination region in the case of retarding ignition (in the case of warming the catalyst) illustrated in FIG. 3, for example.

As described above, in the case where the first crank angular velocity difference (the combustion effect variation) is less than or equal to the first threshold and the second crank angular velocity difference (the λ effect variation) is less than or equal to the second threshold, the ECU 50 may perform the increase correction on the fuel supply amount. As the air-fuel ratio becomes richer (λ<1), the combustion rate may increase, a heat release rate may increase, and a rotation increase rate may increase. In contrast, as the air-fuel ratio becomes leaner (λ>1), the combustion rate may decrease, the heat release timing may become late, and the rotation increase rate may decrease. Thus, the first threshold and the second threshold may each be set on the basis of the crank angular velocity difference where λ is 1.

In one example, the first threshold for determining whether the combustion is weak or strong may be set to a value lower by, for example, 20 rpm to 50 rpm, as compared with the case where λ is 1. Further, the second threshold for determining whether the weak combustion is attributed to the lean air-fuel ratio may be set to a value lower by, for example, about 5 rpm as compared with the case where λ is 1. In one example, from the viewpoint of preventing erroneous determination, one or both of the first threshold and the second threshold may be decreased by taking friction into account, as the cooling water temperature, the oil temperature, etc., are lower (in other words, as the friction increases and the increase in the engine speed becomes moderate). In this case, for example, a map which defines a relationship of the engine speed and the cooling water temperature (or the oil temperature) versus the first threshold and a map which defines a relationship of the engine speed and the cooling water temperature (or the oil temperature) versus the second threshold may be stored in advance in the EEPROM, etc., and the first threshold and the second threshold may be set on the basis of the map or by searching the map.

Note that the ECU 50 may gradually reduce the increase correction amount of the fuel in a case where one or both of the following cases are satisfied: the first crank angular velocity difference (the combustion effect variation) becomes larger than the first threshold, i.e., the combustion becomes stronger; and the second crank angular velocity difference (the λ effect variation) becomes larger than the second threshold, in other words, the lean air-fuel ratio is resolved.

In more detail, the ECU 50 may perform the increase correction on the fuel amount for each cycle in the case where the first crank angular velocity difference (the combustion effect variation) is less than or equal to the first threshold and the second crank angular velocity difference (the λ effect variation) is less than or equal to the second threshold. In contrast, the ECU 50 may gradually reduce the increase correction amount of the fuel to avoid rapid fluctuations, in a case where one or both of the following cases are satisfied: the first crank angular velocity difference (the combustion effect variation) becomes larger than the first threshold, i.e., the combustion becomes stronger; and the second crank angular velocity difference (the λ effect variation) becomes larger than the second threshold, in other words, the lean air-fuel ratio is resolved.

The ECU 50 may be configured to reduce the increase correction amount if a predetermined cycle has elapsed after starting the engine 10. In addition, the ECU 50 may finish the increase correction if the rotational fluctuation exceeds the reference rotational fluctuation of the case where λ is 1.

In one example, the ECU 50 may acquire the first crank angular velocity difference (the combustion effect variation) and the second crank angular velocity difference (the λ effect variation) for each cylinder of the engine 10. Thereafter, the ECU 50 may determine a combustion state and execute the increase correction on the fuel supply amount for each cylinder of the engine 10.

In one example, the air-fuel ratio sensor 19 may be inactive (air-fuel ratio feedback may not be started yet) during cold start of the engine 10, in a case where the cooling water temperature or the oil temperature is lower than or equal to a predetermined temperature, for example. In such a case, the ECU 50 may acquire the first crank angular velocity difference (the combustion effect variation) and the second crank angular velocity difference (the λ effect variation), and may execute the increase correction on the fuel supply amount. However, after the air-fuel ratio sensor 19 is activated (after start of the air-fuel ratio feedback), the ECU 50 may finish acquiring the first crank angular velocity difference (the combustion effect variation) and the second crank angular velocity difference (the λ effect variation), and finish executing the increase correction on the fuel supply amount. Note that determination as to whether to increase the fuel amount on the basis of the cooling water temperature, the oil temperature, etc., may be performed, for example: by providing a condition branch (a condition statement) for determining whether to execute a correction process on a program; or, not by providing such a condition branch (that is, the process is executed), but, for example, by entering a value in which the correction is not performed on a region (a grid point) that is higher than a predetermined temperature in the above-described map (the data) (for example, by setting one or both of the first threshold and the second threshold to zero).

Figure 6:
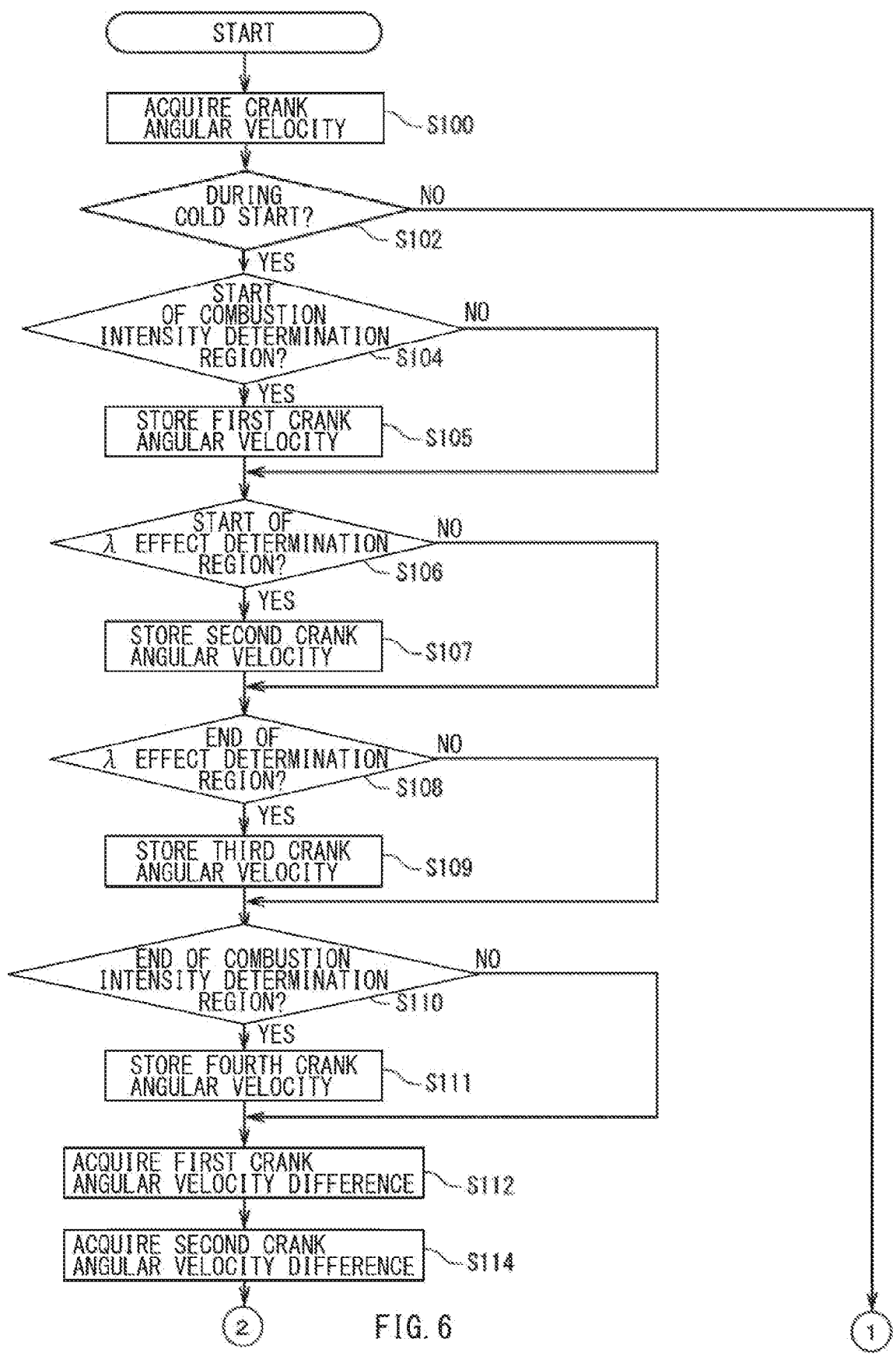
FIG. 6 is a flowchart (part 1) illustrating a procedure of a cold start process to be performed by the control apparatus for an engine of one example embodiment.
Figure 7:
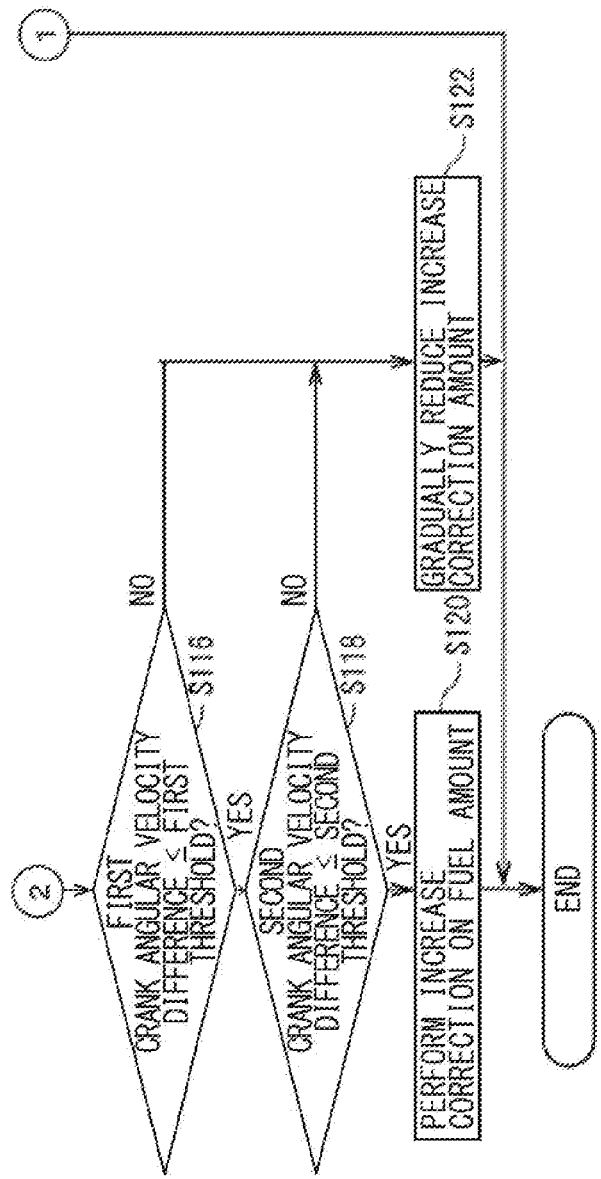
FIG. 7 is a flowchart (part 2) illustrating the procedure of the cold start process to be performed by the control apparatus for an engine of one example embodiment.

Referring to FIGS. 6 and 7, an operation of the control apparatus 1 for an engine will be described. Here, FIGS. 6 and 7 are each a flowchart illustrating a procedure of a cold start process to be performed by the control apparatus 1 for an engine. The process may be repeatedly executed by the ECU 50 at predetermined timings.

In step S100, the ECU 50 may start cranking of the engine 10, and may acquire the crank angular velocity (the engine speed) for each interval of, for example, 30 degrees CA.

In step S102, the ECU 50 may determine whether it is during cold start (whether the cooling water temperature is lower than or equal to a predetermined temperature). If the ECU 50 determines that it is during cold start (step S102: YES), the process may proceed to step S104. If the ECU 50 determines that it is not during cold start (step S102: No), the ECU 50 may exit the process.

In step S104, the ECU 50 may determine, for each cylinder, whether the rotational position of the crankshaft 10a is at a crank angle position at which the combustion intensity determination region (the first region) starts. If the ECU 50 determines that the rotational position of the crankshaft 10a is at the crank angle position at which the combustion intensity determination region starts (step S104: YES), the ECU 50 may acquire and store a first crank angular velocity (an engine speed) in step S105, and may thereafter cause the process to make the transition to step S106. If the ECU 50 determines that the rotational position of the crankshaft 10a is not at the crank angle position at which the combustion intensity determination region starts (step S104: NO), the ECU 50 may cause the process to make the transition to step S106.

In step S106, the ECU 50 may determine, for each cylinder, whether the rotational position of the crankshaft 10a is at a crank angle position at which the λ effect determination region (the second region) starts. If the ECU 50 determines that the rotational position of the crankshaft 10a is at the crank angle position at which the λ effect determination region starts (step S106: YES), the ECU 50 may acquire and store a second crank angular velocity (an engine speed) in step S107, and may thereafter cause the process to make the transition to step S108. If the ECU 50 determines that the rotational position of the crankshaft 10a is not at the crank angle position at which the λ effect determination region starts (step S106: NO), the ECU 50 may cause the process to make the transition to step S108.

In step S108, the ECU 50 may determine, for each cylinder, whether the rotational position of the crankshaft 10a is at a crank angle position at which the λ effect determination region ends. If the ECU 50 determines that the rotational position of the crankshaft 10a is at the crank angle position at which the λ effect determination region ends (step S108: YES), the ECU 50 may acquire and store a third crank angular velocity (an engine speed) in step S109, and may thereafter cause the process to make the transition to step S110. If the ECU 50 determines that the rotational position of the crankshaft 10a is not at the crank angle position at which the λ effect determination region ends (step S108: NO), the ECU 50 may cause the process to make the transition to step S110.

In step S110, the ECU 50 may determine, for each cylinder, whether the rotational position of the crankshaft 10a is at a crank angle position at which the combustion intensity determination region ends. If the ECU 50 determines that the rotational position of the crankshaft 10a is at the crank angle position at which the combustion intensity determination region ends (step S110: YES), the ECU 50 may acquire and store a fourth crank angular velocity (an engine speed) in step S111, and may thereafter cause the process to make the transition to step S112. If the ECU 50 determines that the rotational position of the crankshaft 10a is not at the crank angle position at which the combustion intensity determination region ends (step S110: NO), the ECU 50 may exit the process.

In step S112, the ECU 50 may determine, for each cylinder, a difference between the first crank angular velocity and the fourth crank angular velocity by subtracting the first crank angular velocity from the fourth crank angular velocity, to thereby acquire the first crank angular velocity difference (the combustion effect variation).

In step S114, the ECU 50 may determine, for each cylinder, a difference between the second crank angular velocity and the third crank angular velocity by subtracting the second crank angular velocity from the third crank angular velocity, to thereby acquire the second crank angular velocity difference (the λ effect variation).

In step S116, the ECU 50 may determine, for each cylinder, whether or not the first crank angular velocity difference is less than or equal to the first threshold, i.e., whether the combustion is weak. If the first crank angular velocity difference is less than or equal to the first threshold (step S116: YES), the ECU 50 may cause the process to make the transition to step S118. If the first crank angular velocity difference is larger than the first threshold, i.e., if the combustion is strong (step S116: NO), the ECU 50 may cause the process to make the transition to step S122.

In step S118, the ECU 50 may determine, for each cylinder, whether or not the second crank angular velocity difference is less than or equal to the second threshold, i.e., whether the air-fuel ratio is lean. If the second crank angular velocity difference is less than or equal to the second threshold (step S118: YES), the ECU 50 may cause the process to make the transition to step S120. If the second crank angular velocity difference is larger than the second threshold, i.e., if the air-fuel ratio is not lean (step S118: NO), the ECU 50 may cause the process to make the transition to step S122.

In step S120, the ECU 50 may perform, for each cylinder, the increase correction on the fuel amount. Thereafter, the ECU 50 may exit the process.

In step S122, the ECU 50 may, for each cylinder, gradually reduce the increase correction amount of the fuel. Thereafter, the ECU 50 may exit the process.

As described above in detail, according to the example embodiment, the first crank angular velocity difference (the combustion effect variation) and the second crank angular velocity difference (the λ effect variation) are acquired. The first crank angular velocity difference (the combustion effect variation) is the change in the crank angular velocity in the first region (the combustion intensity determination region). The first region (the combustion intensity determination region) includes the rotational change correlated with the engine torque output (the combustion intensity) in one or both of the compression stroke and the expansion stroke.

The second crank angular velocity difference (the λ effect variation) is the change in the crank angular velocity in the second region (the λ effect determination region). The second region (the λ effect determination region) includes the rotational change correlated with the combustion rate attributable to the air-fuel ratio (the fuel property) in one or both of the compression stroke and the expansion stroke. In the case where the first crank angular velocity difference (the combustion effect variation) is less than or equal to the first threshold and the second crank angular velocity difference (the λ effect variation) is less than or equal to the second threshold, the increase correction is performed on the fuel supply amount. In other words, in the case where it is determined that the combustion is weak (i.e., the torque output owing to the combustion is low) and the weak combustion is attributed to the lean air-fuel ratio, the increase correction is performed on the fuel amount, and the lean air-fuel ratio is thus resolved (i.e., the air-fuel ratio becomes closer to the stoichiometric ratio). This helps to prevent erroneous detection and to improve the combustion state. As a result, it becomes possible to prevent the combustion deterioration at time of engine start, i.e., to improve the combustion stability.

The fuel amount (the increase correction amount) for cold start has been set in such a manner that no misfire occurs even in the worst condition. In other words, the setting has been excessive unless the worst condition is used. According to the example embodiment, it is possible to reduce the fuel amount (the increase correction amount) for cold start, and it is possible to improve emission, etc.

According to the example embodiment, the first region (the combustion intensity determination region) which includes the rotational change correlated with the engine torque output (the combustion intensity) is set to include the region from before the combustion to the end of the combustion, whereas the second region (the λ effect determination region) which includes the rotational change correlated with the combustion rate attributable to the air-fuel ratio (the fuel property) is set to include the region from the timing at which the combustion of the air-fuel mixture starts and the torque starts to be outputted to the timing at which the combustion substantially ends (for example, the region in which a mass combustion ratio is from 50% to 90%). This makes it possible to accurately determine the intensity of the combustion, or whether the combustion is weak or strong, and to accurately determine whether the weak combustion is attributed to the lean air-fuel ratio.

According to the example embodiment, the first crank angular velocity difference (the combustion effect variation) and the second crank angular velocity difference (the λ effect variation) are acquired for each cylinder of the engine 10, and the increase correction on the fuel supply amount is executed for each cylinder of the engine 10. This makes it possible to perform an optimum correction for each cylinder (including a correction on air-fuel ratio variation between cylinders), and to improve the combustion of each cylinder. Thus, it is possible to minimize deterioration in emission and fuel consumption.

In one example, according to the example embodiment, the second region (the λ effect determination region) in which the second crank angular velocity difference (the λ effect variation) is to be acquired is varied in accordance with ignition timing. The second region (the λ effect determination region) is correlated with combustion rate attributable to the air-fuel ratio (the fuel property). Accordingly, it is possible to more accurately determine the lean air-fuel ratio, and to prevent erroneous determination.

In one example, according to the example embodiment, the air-fuel ratio sensor 19 is inactive (the air-fuel ratio feedback is not started yet) during cold start of the engine 10 (for example, under the condition that the cooling water temperature is lower than or equal to a predetermined temperature). In such a case, the first crank angular velocity difference (the combustion effect variation) and the second crank angular velocity difference (the λ effect variation) are acquired, and the increase correction on the fuel supply amount is executed. After the air-fuel ratio sensor 19 is activated (after the start of the air-fuel ratio feedback), the acquisition of the first crank angular velocity difference (the combustion effect variation) and the second crank angular velocity difference (the λ effect variation) and the increase correction on the fuel supply amount are finished. Accordingly, it is possible to improve the combustion (i.e., to improve the combustion stability) when the air-fuel ratio sensor 19 is inactive (before the start of the air-fuel ratio feedback) during cold start, in other words, when combustion deterioration is most conceivable.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof. For example, the first region (the combustion intensity determination region) in which the first crank angular velocity difference (the combustion effect variation) is to be acquired, and the second region (the λ effect determination region) in which the second crank angular velocity difference (the λ effect variation) is to be acquired are not limited to the example embodiment. For example, it is possible to optionally move back and forth each of the regions depending on conditions, etc.

In the example embodiment, the fuel amount is adjusted (increased) in the case where the first crank angular velocity difference is less than or equal to the first threshold and the second crank angular velocity difference is less than or equal to the second threshold. However, an ignition timing and a fuel injection timing may be adjusted in addition to or instead of the fuel amount.

In the example embodiment, the description has been given of the four-cylinder engine serving as the engine 10. However, the disclosure is also applicable to an engine other than the four-cylinder engine. In the example embodiment, the description has been given of the case where the disclosure is applied to the direct injection engine. However, the disclosure is also applicable to: a port injection engine; and an engine in which an in-cylinder injection and a port injection are combined.

According to at least one embodiment of the disclosure, it is possible to prevent combustion deterioration (i.e., to improve combustion stability) at time of engine start. In one example, in a period until an air-fuel ratio sensor is activated during cold start, the combustion stability is improved by preventing the combustion deterioration caused by a lean air-fuel ratio attributable to a fuel property of a heavy fuel.

The ECU 50 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the ECU 50 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the ECU 50 illustrated in FIG. 1.

The invention claimed is:

1. A control apparatus for an engine, the control apparatus comprising:
   a crank angle sensor configured to detect a rotational position of a crankshaft of the engine; and
   a processor configured to acquire a crank angular velocity for each interval of a fixed crank angle on a basis of a temporal change in the rotational position of the crankshaft detected by the crank angle sensor, and control a fuel amount to be supplied to the engine on a basis of the crank angular velocity,
   wherein the processor is configured to:
      acquire a first crank angular velocity difference indicating variation in combustion intensity of a fuel in the engine, wherein the first crank angular velocity difference is a change in the crank angular velocity in a first region, and wherein the first region including a rotational change correlated with an engine torque output is set to include a region from before combustion of an air-fuel mixture to an end of the combustion of the air-fuel mixture;
      acquire a second crank angular velocity difference, different from the first crank angular velocity difference, indicating variation in air-fuel ratio, wherein the second crank angular velocity difference is a change in the crank angular velocity in a second region, and wherein the second region including a rotational change correlated with a combustion rate attributable to an air-fuel ratio is set to include a region from a timing at which the combustion of the air-fuel mixture starts and a torque starts to be outputted to a timing at which the combustion substantially ends; and
      in a case where the first crank angular velocity difference is less than or equal to a first threshold and the second crank angular velocity difference is less than or equal to a second threshold, perform an increase correction on the fuel amount to be supplied to the engine;
   wherein the first threshold is a criterion for determining whether combustion is strong or weak, and
   wherein the second threshold, different from the first threshold, is a criterion for determining whether determination of weak combustion is due to a lean air-fuel ratio.

2. The control apparatus according to claim 1, wherein the processor is configured to acquire, for each of cylinders of the engine, the first crank angular velocity difference and the second crank angular velocity difference, and execute, for each of the cylinders of the engine, the increase correction on the fuel amount to be supplied to the engine.

3. The control apparatus according to claim 2, wherein the processor is configured to vary, in accordance with an ignition timing, the second region including the rotational change correlated with the combustion rate attributable to the air-fuel ratio.

4. The control apparatus according to claim 3, the control apparatus further comprising an air-fuel ratio sensor configured to detect the air-fuel ratio, wherein
   the processor is configured to
      when the air-fuel ratio sensor is inactive during cold start of the engine, acquire the first crank angular velocity difference and the second crank angular velocity difference, and execute the increase correction on the fuel amount to be supplied to the engine; and
      after the air-fuel ratio sensor is activated, finish acquiring the first crank angular velocity difference and the second crank angular velocity difference, and finish executing the increase correction on the fuel amount to be supplied to the engine.

5. The control apparatus according to claim 2, the control apparatus further comprising an air-fuel ratio sensor configured to detect the air-fuel ratio, wherein
   the processor is configured to
      when the air-fuel ratio sensor is inactive during cold start of the engine, acquire the first crank angular velocity difference and the second crank angular velocity difference, and execute the increase correction on the fuel amount to be supplied to the engine; and
      after the air-fuel ratio sensor is activated, finish acquiring the first crank angular velocity difference and the second crank angular velocity difference, and finish executing the increase correction on the fuel amount to be supplied to the engine.

6. The control apparatus according to claim 1, wherein the processor is configured to vary, in accordance with an ignition timing, the second region including the rotational change correlated with the combustion rate attributable to the air-fuel ratio.

7. The control apparatus according to claim 6, the control apparatus further comprising an air-fuel ratio sensor configured to detect the air-fuel ratio, wherein
   the processor is configured to
      when the air-fuel ratio sensor is inactive during cold start of the engine, acquire the first crank angular velocity difference and the second crank angular velocity difference, and execute the increase correction on the fuel amount to be supplied to the engine; and
      after the air-fuel ratio sensor is activated, finish acquiring the first crank angular velocity difference and the second crank angular velocity difference, and finish executing the increase correction on the fuel amount to be supplied to the engine.

8. The control apparatus according to claim 1, the control apparatus further comprising an air-fuel ratio sensor configured to detect the air-fuel ratio, wherein
   the processor is configured to
      when the air-fuel ratio sensor is inactive during cold start of the engine, acquire the first crank angular velocity difference and the second crank angular velocity difference, and execute the increase correction on the fuel amount to be supplied to the engine; and
      after the air-fuel ratio sensor is activated, finish acquiring the first crank angular velocity difference and the second crank angular velocity difference, and finish executing the increase correction on the fuel amount to be supplied to the engine.

* * * * *